(12) United States Patent
Mercer et al.

(10) Patent No.: US 6,781,822 B1
(45) Date of Patent: Aug. 24, 2004

(54) BACKPLANE FOR INDUSTRIAL COMPUTERS

(75) Inventors: Steven James Mercer, Rockwood (CA); Rudolf Heidebrecht, Branchton (CA); Ovidiu-Mihai Mesesan, Waterloo (CA); Ben Robitaille, Waterloo (CA)

(73) Assignee: Kaparel Corporation, Waterloo (CA)

( * ) Notice: Subject to any disclaimer, the term of this patent is extended or adjusted under 35 U.S.C. 154(b) by 473 days.

(21) Appl. No.: 09/690,997

(22) Filed: Oct. 18, 2000

Related U.S. Application Data (60) Provisional application No. 60/219,013, filed on Jul. 19, 2000.

(51) Int. Cl.[7] .................................................. G06F 1/16
(52) U.S. Cl. ........................ 361/683; 361/727; 361/729; 710/300
(58) Field of Search ................................ 361/663, 679, 361/686, 788, 785, 790, 791, 796, 803, 724–729, 805; 710/8–19, 101, 126, 128, 102, 103, 117; 439/305, 316, 61, 64, 78, 74, 83, 951, 945, 65, 59; 395/281, 286, 297, 308, 65

(56) References Cited

U.S. PATENT DOCUMENTS

| | | | |
|---|---|---|---|
| 5,282,112 A | * | 1/1994 | Bremer ........................ 361/729 |
| 5,530,811 A | | 6/1996 | Benton et al. |
| 5,603,044 A | | 2/1997 | Annapareddy et al. |
| 6,112,271 A | * | 8/2000 | Lanus et al. ................. 710/306 |
| 6,282,599 B1 | * | 8/2001 | Gallick et al. .............. 710/306 |
| 6,349,037 B1 | * | 2/2002 | Draughn et al. ............ 361/788 |
| 6,356,966 B1 | * | 3/2002 | Loach et al. .................. 439/78 |
| 6,356,967 B1 | * | 3/2002 | Vaisanen et al. ............ 710/300 |
| 6,425,027 B1 | * | 7/2002 | Mills et al. .................. 710/300 |
| 6,496,376 B1 | * | 12/2002 | Plunkett et al. ............. 361/729 |
| 6,542,952 B1 | * | 4/2003 | Western ....................... 710/305 |

* cited by examiner

Primary Examiner—Michael Datskovsky
(74) Attorney, Agent, or Firm—Miles & Stockbridge P.C.; John C. Kerins (57) ABSTRACT

A modular backplane having a low-profile bridge module for industrial computers is disclosed. The modular backplane generally comprises a plurality of modular backplane segments and a plurality of bridge modules for connecting the modular backplane segments. Each modular backplane segment includes a front side and a back side, in which the front side has a plurality of slots and the back side has a primary dedicated connector and a secondary dedicated connector. Each bridge module includes a circuit board, a bridging integrated circuit, and a pair of connectors. One of the bridge connectors is engaged with the primary dedicated connector in one of the backplane segments and the other connector is engaged with the secondary dedicated connector in its neighboring segments, and vice versa, such that all the modular backplane segments are communicatively connected with another. The modular bridge is of a low-profile, and the dedicated connectors are provided in an area where no slot is formed.

29 Claims, 8 Drawing Sheets

BACKPLANE FOR INDUSTRIAL COMPUTERS

CROSS REFERENCE TO RELATED APPLICATION

The Subject matter of this invention is related to Provisional Application Ser. No. 60/219,013, filed Jul. 19, 2000. The subject matter of said application is hereby incorporated by reference.

FIELD OF THE INVENTION

The present invention relates generally to a backplane of an industrial computer system, and particularly relates to a modular backplane comprising a plurality of backplane segments which are bridged together by a low-profile bridge module.

BACKGROUND OF THE INVENTION

Conventionally, a computer system utilizes a bus as a pathway or channel for data communication among the components of the system. A popular bus architecture is the PCI (Peripheral Component Interconnect) bus architecture. The PCI bus standard (specification) is well suited to personal computers. There are, however, numerous limitations of the PCI bus specification that make the bus impractical for industrial computers.

In order to provide a standard form factor for industrial computers, the PCI Industrial Computer Manufacturers Group (PICMG™) has prepared the Compact PCI Specification that employs mechanically robust connectors and has a bus that conforms to the PCI Specification. This Compact PCI bus architecture is an implementation of PCI technology designed for industrial and/or embedded applications. The Compact PCI standard also has limitations on certain design aspects, such as the number of slots on the bus. More specifically, the Compact PCI standard defines that the PCI compliant bus has a maximum of eight electrical loads. This means that the backplane of a computer system is limited to have a maximum of eight slots.

Accordingly, it would be desirable to be able to provide a backplane of an industrial computer with more than eight slots (electrical loads). Several attempts have been made for provision of more than eight slots on the backplanes of industrial computer systems.

Figure 1A:
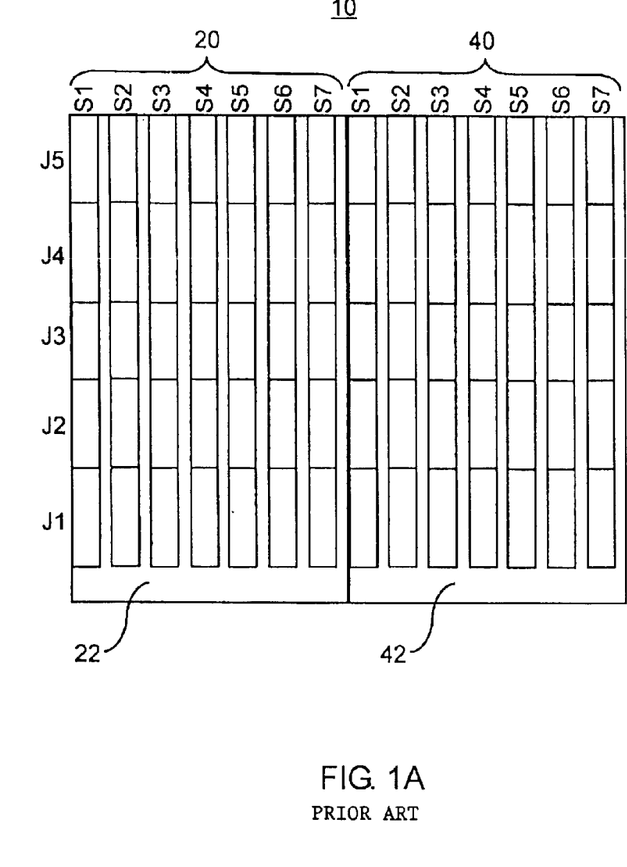
FIG. 1A is a schematic view of the front side of an earlier type of modular backplane.
Figure 1B:
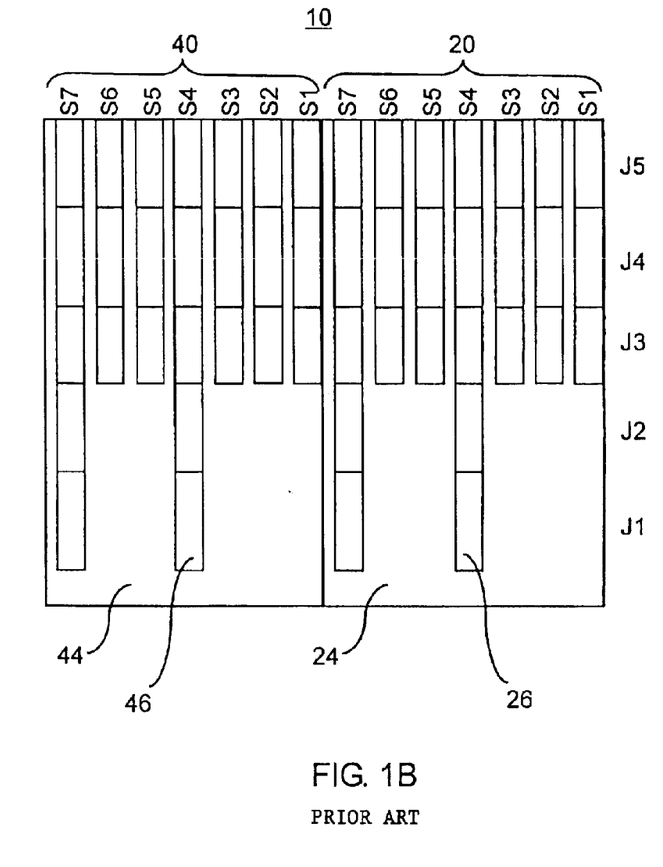
FIG. 1B is a schematic view of the back side of the earlier type of modular backplane.
Figure 2A:
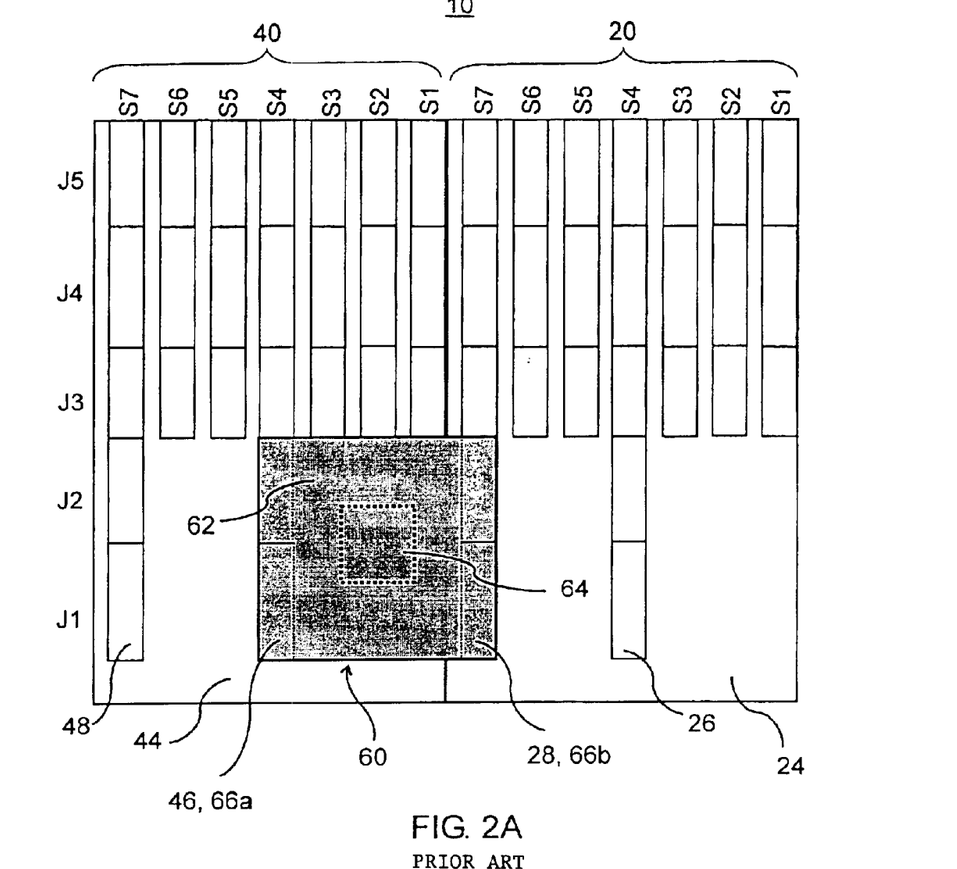
FIG. 2A is a schematic plan view of the earlier type of modular backplane with a bridge module engaged.
Figure 2B:
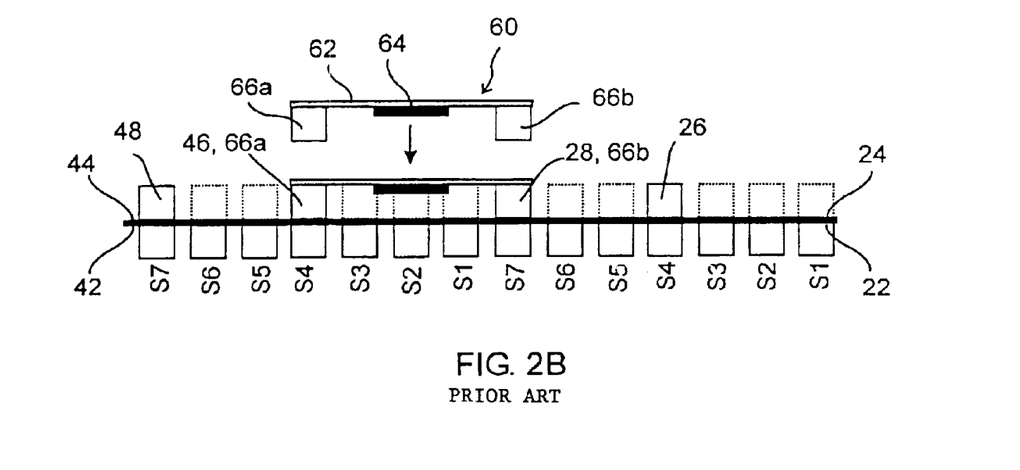
FIG. 2B is a frontal elevation view of the FIG. 2A.

One of the most recent attempts is illustrated in FIGS. 1A to 2B, which is described in U.S. application Ser. No. 09/538,733 of Steven J. Mercer, et al., filed on Mar. 30, 2000. As shown in the figures, this approach relates to a modular backplane having two or more backplane segments, which are bridged by a bridge module and, respectively, include a PCI compliant bus, although the figures illustrate only two backplane segments for convenience of description. The modular backplane 10 comprises two backplane segments 20 and 40 bridged by a bridge module 60, where the segment 40 acts as a primary or beginning segment and the segment 20 as a secondary or ending segment, which means that a system board is supposed to be inserted into the beginning segment 40. FIGS. 1A and 1B show a configuration of the front side and back side of the segments. Each segment has a front side 22 (44) and a back side 24 (44) and the front sides 22, 42 includes several slots (S1 to S7), which are for the insertion of a system board and peripheral boards. Each of the slots consists of five connectors (J1 to J5). FIG. 2A shows the back sides 24, 44 of the backplane segments 20, 40 bridged by the bridge module 60, and FIG. 2B is a frontal elevation view of FIG. 2A. As is shown in FIGS. 1B and 2A, the back sides 24, 44 of the segments 20, 40 also includes several slots (S1 to S7 respectively) of two different lengths, in which the long slot 46, 48 in the primary segment 20 and 26, 28 in the secondary segment 40 serve as bridge modular slots for the insertion of the bridge module 60. More specifically, the connectors J1 and J2 of the slots 26, 46 denote a bridge module primary slot, and the connectors J1 and J2 of the slot 28, 48 denote a bridge module secondary slot. The remaining short slots may be utilized for other add-in cards such as a transition module.

As depicted in FIGS. 2A and 2B, the bridge module 60 comprises a circuit board 62, a bridging IC 64, and a pair of connectors 66a, 66b. The connector 66a is engaged with the bridge module primary slot 46 of the primary (or beginning) backplane segment 40, while the connector 66b is engaged with the bridge module secondary slot 28 of the secondary (or ending) segment 20, as is clearly depicted in FIG. 2B. Therefore, a busing between the primary and secondary backplane segments 40, 20 has been established. In the case shown in the figures, a system board may be inserted into the slot S7 of the front side 42 of the primary backplane segment 40, which is exactly opposite to the bridge module secondary slot 48. By using another bridge module, another backplane segment may be connected to the right side of the secondary (ending) segment 20 in FIG. 2A, such that two or more backplane segments can be communicatively interconnected to each other by bridge modules, thereby providing more than eight slots (electrical loads) on the backplanes of industrial computers.

However, this approach embraces several disadvantages that must be solved. Firstly, it is inevitable that the back side bridge slot share its pins, in part, with the front side peripheral board slot, backwardly opposite to the bridge module slot. Therefore, the type of the board to be inserted into the front side peripheral board slot is limited. Also, the signaling of the bridge module is limited by that of the peripheral board inserted into the front side slot, and vice versa. Secondly, as is shown in FIG. 2B, it is also unavoidable that the bridge module, when engaged, protrude excessively over the height of the back side bridge slot. This implementation does not meet the governing standard (IEEE 1101.11), which allows for components of the backplane to protrude no more than 19.94 mm, measured from the front surface of the backplane. The bridge module of this technology protrudes around 24 mm from the front surface of the backplane. Furthermore, the protrusion of the bridge interferes potentially with the insertion of add-in cards, such as transition modules, into the back side slots.

SUMMARY OF THE INVENTION

In accordance with an aspect of the present invention, there is provided a modular backplane for an industrial computer, in which the modular backplane comprises a first modular backplane segment, a second modular backplane segment and a bridge module. The first modular backplane segment includes a first front side and a first back side, in which the first front side has a plurality of slots, and the first back side has a first dedicated connector. The second modular backplane segment includes a second front side and a second back side, in which the second front side has a plurality of slots, and the second back side has a second dedicated connector. The first and second dedicated connectors are provided in an area where no slot is formed. The bridge module includes a pair of connectors. One of the bridge connectors is engaged with the first dedicated connector and the other is engaged with the second dedicated connector, such that the first and second modular backplane segments are connected to each other communicatively.

The slots provided in the first front side may provide for the insertion of a system slot board and a plurality of peripheral boards and all of the slots in the second front side may provide for the insertion of a plurality of peripheral boards, and vice versa. The first back side and the second back side each may further include a plurality of slots, which may provide for the insertion of add-in cards such as a transition module.

Preferably, the modular bridge is of a low-profile, such that the height of the bridge module is less than 16 mm, the width less than 12 HP, and the length less than 94 mm. The first and second dedicated connectors are formed in an area where no slot is formed.

In accordance with a further aspect of the present invention, there is provided a modular backplane for an industrial computer, in which the modular backplane comprises a plurality of modular backplane segments and a plurality of bridge modules. Each modular backplane segment includes a front side and a back side, in which the front side has a plurality of slots, and the back side has a primary dedicated connector and a secondary dedicated connector. The primary and secondary dedicated connectors are provided in an area where no slot is formed. Each bridge module includes a pair of connectors. One of the bridge connectors is engaged with the primary dedicated connector and the other is engaged with the secondary dedicated connector in its neighboring segments, and vise versa, such that all the modular backplane segments are communicatively connected.

The slots provided in the front side of one of the backplane segments may provide for the insertion of a system slot board and a plurality of peripheral boards and all of the slots in the front side of the remaining backplane segments for the insertion of a plurality of peripheral boards. The first back side may further include a plurality of slots, which may provide for the insertion of add-in cards such as a transition module.

Preferably, the modular bridge is of a low-profile, such that the height of the bridge module is less than 16 mm, the width less than 12 HP, and the length less than 94 mm. The dedicated connectors are provided in an area where no slot is formed.

Therefore, in contrast to the previous approach, the present invention provides greater flexibility in the type and the number of peripheral boards to be inserted into the front side of the backplane, and in the type and the number of the signals to be accommodated on the peripheral board and the bridge module. Furthermore, it eliminates any interference by the bridge module with the insertion of add-in cards, such as transition modules, into the back side slots of the backplane.

Accordingly, it is an object of the present invention to provide an improved modular backplane configuration having a dedicated connector for a bridge module, in m which a greater flexibility in the type of and the number of slots and the peripheral boards inserted thereto can be allowed in the front side of the backplane segments.

It is another object of the present invention to provide an improved modular backplane configuration having a dedicated connector for a bridge module, in which a greater flexibility in the type and the number of signals can be allowed not only in the bridge module of the back side but in the peripheral board of the front side of the backplane segments.

It is another object of the present invention to provide an improved modular backplane configuration having a dedicated connector for a bridge module, in which the insertion of add-in cards in the back side can not be interfered by the implementation of the bridge module.

It is another object of the present invention to provide an improved low-profile bridge module which can accomplish the above-described objects of the invention.

In accordance with a further aspect of the present invention, there is provided a monolithic backplane for an industrial computer, which includes: a first backplane segment having a first front side and a first back side, the first front side including a plurality of slots, the first back side including a first dedicated connector, a second backplane segment having a second front side and a second back side, the second front side including a plurality of slots, the second back side including a second dedicated connector, a bridge module having two connectors, one of which is engaged with the first dedicated connector and the other is engaged with the second dedicated connector, thereby communicatively connecting the first and second backplane segments. The first and second dedicated connectors are provided in an area where no slot is formed.

A further understanding of the other features, aspects, and advantages of the present invention will be realized by reference to the following description, appended claims, and accompanying drawings.

BRIEF DESCRIPTION OF THE DRAWINGS

The embodiments of the invention will now be described with reference to the accompanying drawings, in which.

DETAILED DISCLOSURE OF THE PREFERRED EMBODIMENT(S)

In general and briefly, a modular backplane of the present invention has differences from the earlier type as described above, in that the backplane has a dedicated connector for a bridge module, and that the bridge module is of a low profile. Therefore, greater flexibility can be allowed in the type and the number of peripheral boards to be inserted into the front side of the backplane, and in the type and the number of the signals to be accommodated on the peripheral board and the bridge module. Furthermore, no disturbance occurs with the insertion of add-in cards, such as transition modules, into the back side slots of the backplane.

Figure 3:
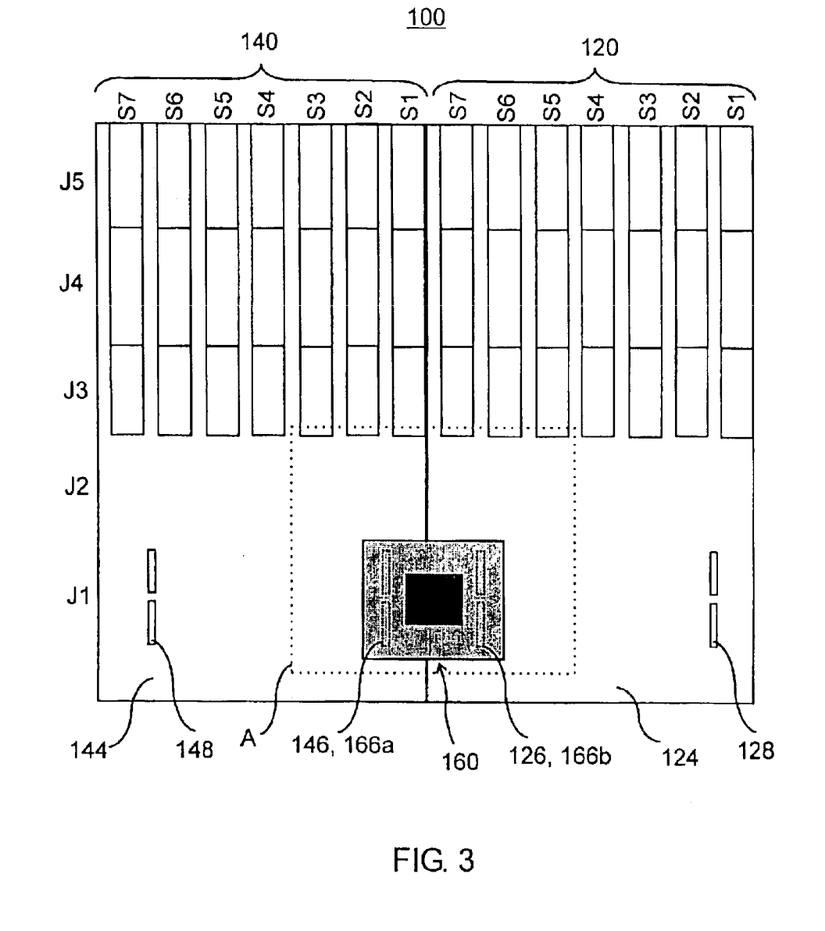
FIG. 3 is a schematic plan view of the back side of a modular backplane in accordance with the present invention.

FIGS. 3 to 5B illustrate a preferred embodiment of the present invention which represent a modular backplane with a low-profile bridge and is denoted generally by a reference numeral 100. This embodiment is a specific 32-bit implementation of the invention, which is designed for 32-bit industrial computers. As shown in FIG. 3, the modular backplane 100, in general, comprises a beginning (or primary) modular backplane segment 140, an ending (or secondary) modular backplane segment 120, and a bridge module 160 bridging the beginning and ending backplane segments 140, 120. All the backplane segments include a PCI compliant bus. In the embodiment, a system board may be supposed to be inserted into one of the slots in the front side (not shown) of the beginning backplane segment 140.

FIG. 3 shows a configuration for the back sides 144, 124 of the beginning and ending segments 140, 120, of which front side configuration may be identical to that illustrated in FIG. 1A. In this embodiment, the back side 144 of the beginning backplane segment 140 comprises a plurality of short slots (S1 to S7), each of which consists of several connectors (J3 to J5), and a dedicated connector 146 for acceptance of the bridge module 160. Similarly, the back side 124 of the beginning backplane segment 120 comprises a plurality of short slots (S1 to S7), each of which consists of several connectors (J3 to J5), and a dedicated connector 126 for acceptance of the bridge module 160. The type and the number of the slots (S1 to S7) are not considered to limit the present invention.

Figure 4A:
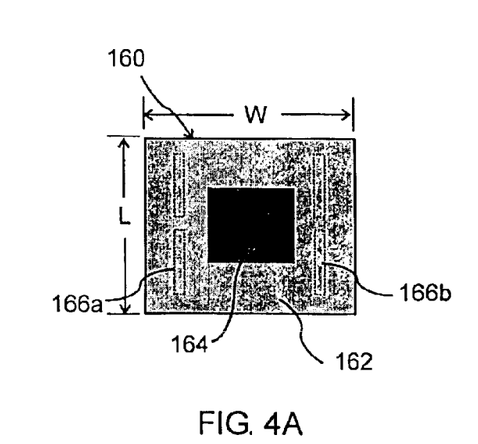
FIG. 4A is a schematic view showing the outer surface configuration of a bridge module in accordance with the present invention.
Figure 4B:
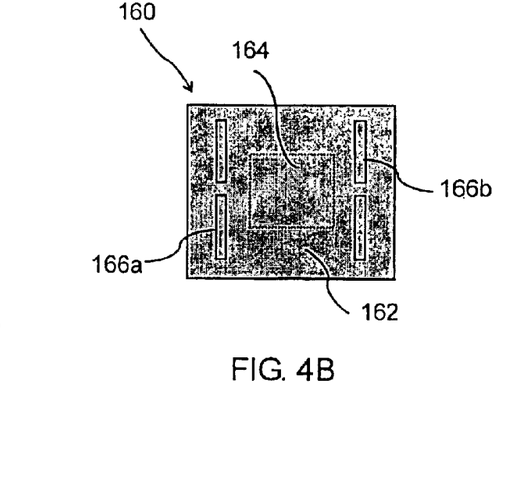
FIG. 4B is a schematic view showing the inner surface configuration of the bridge module in the FIG. 4A.
Figure 5A:
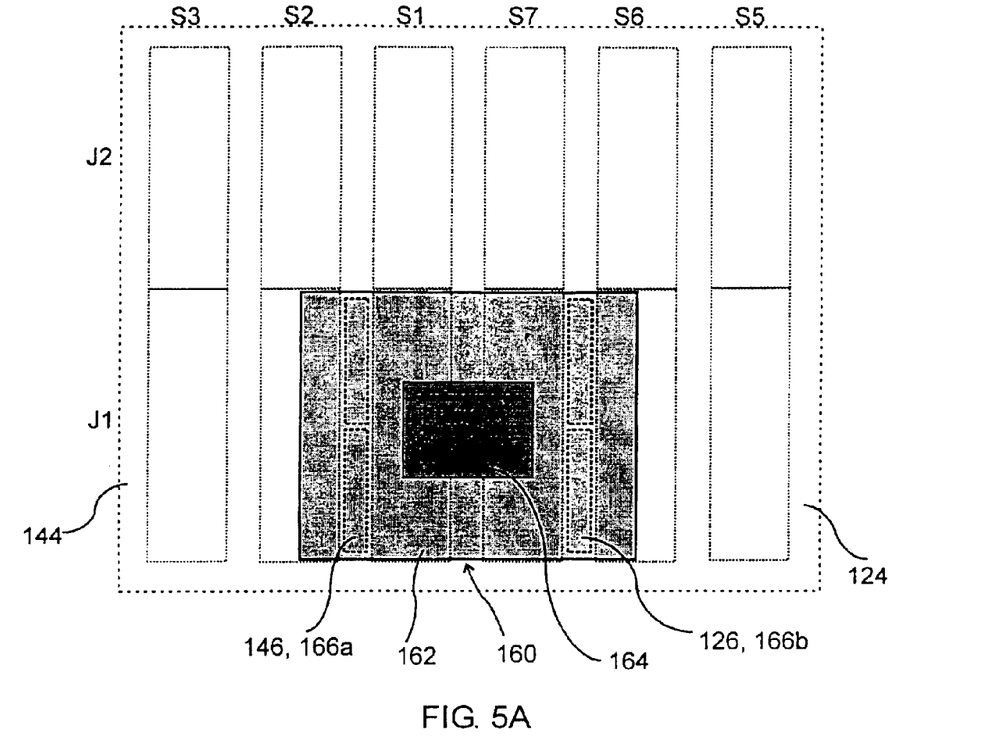
FIG. 5A is an enlarged view of the portion indicated by A in the FIG. 3.
Figure 5B:
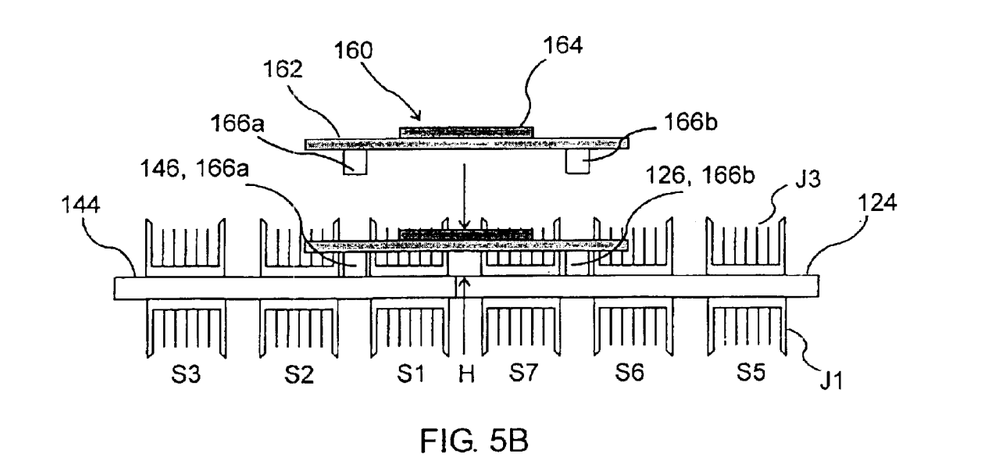
FIG. 5B is a frontal elevation view of the portion indicated by A in the FIG. 3.

The bridge module 160 includes a circuit board 162, a bridging IC 164, and a pair of connectors 166a, 166b, as is clearly shown in the figures. FIGS. 4A and 4B are plan views of the outer side and inner side respectively of the bridge module 160. FIG. 5A is an enlarged view of the portion indicated by A in the FIG. 3, and FIG. 5B is a frontal elevation view of FIG. 5A, both of which show clearly the configuration for the engagement of the bridge module 160 with the two modular backplane segments 120, 140. The bridging IC 164 is attached to the outer surface, however, it may be engaged with the inner surface of the circuit board 162, depending on the design of the circuit board routing.

As is apparent from FIGS. 5A and 5B, the bridge connector 166a of the bridge module 160 is engaged with the dedicated connector 146 of the beginning segment 144, and the bridge connector 166b is engaged with the dedicated connector 126 of the ending segment 120, such that a bushing communication between the beginning and ending segments 120, 140 can be established, and therefore the two backplane segments can be interconnected communicatively to each other.

Referring to FIG. 5A and 5B again, the dedicated connectors 126, 146 of the backplane segments 120, 140 are formed in the area exclusive of where a slot is formed not only in the back sides, but also the front sides of the backplane segments. Therefore, in contrast to the earlier approach, the present invention does not limit the type of the peripheral board to be inserted into the front side of the backplane segments. Also, it provides a greater flexibility in the signaling mode of the peripheral board and the bridge module as well. In this embodiment, the dedicated connectors 126, 146 are formed in the area such that the width W of the bridge module (shown in FIG. 4A) can be minimized, specifically, as shown in FIG. 3, between the respective pair of slots of two neighboring pairs of slots in the front sides of the beginning and ending backplane segments. Preferably, the width of the bridge module 160 may be less than 12 HP.

Providing the dedicated connectors for a bridge module makes the bridge module itself to be able to be compact in its dimensions, such as the height H, the width W, and the length L which are depicted in FIGS. 4A and 5B. Preferably, in this specific embodiment, the height H of the bridge module 160 may be made less than 16 mm, which meets the governing standard IEEE 110.11 and it does not protrude over the slot, thereby not interfering with the insertion of add-in cards into the back side slots of the backplane segment. The width W of the bridge module may be reduced to less than 12 HP, and the length L to less than 50 mm, which can also enhance the flexibility in acceptance of add-in cards in the back side of the modular backplane.

Preferably, the back sides 124, 144 of the backplane segments 120, 140 may further include additional dedicated connectors 128, 148 respectively, so that, by using an additional bridge module, a further backplane segment can be bridged to the right-hand side or the left-hand side of the backplane 100 shown in FIG. 3. In this way, two or more backplane segments may be bridged, thereby extending the number of the front side slots for peripheral boards, while providing a great flexibility in selecting the type of peripheral boards and the bridging signal mode.

FIGS. 6 to 8B illustrate another preferred embodiment of the present invention which represent a modular backplane with a low-profile bridge and is denoted generally by reference numeral 200. This embodiment is a specific 64-bit implementation of the invention, which is designed for 64-bit industrial computers. Similarly to the previous embodiment, the modular backplane 200, in general, comprises a beginning (or primary) modular backplane segment 240, an ending (or secondary) modular backplane segment 220, and a bridge module 260 bridging the beginning and ending backplane segments 220, 240. All the backplane segments include a PCI compliant bus. In the embodiment, a system board may be supposed to be inserted into one of the slots in the front side (not shown) of the beginning backplane segment 240.

In this embodiment, the structure and functions of all the portions are nearly identical to those of the previous one except for the configuration of the dedicated connectors 226, 246 provided in the back sides 224, 244 of the segments 220, 240 and, as well, the structure of the connectors 266a, 266b provided in the bridge module 260. As is intuitively understandable to those skilled in the art, the connectors of the 64-bit bridging are likely to requires more pin-outs, compared to the previous 32-bit bridging, which means that, in order to accommodate the number of pin-outs, the 64-bit bridge module 260 may be forced to be longer than the previous 32-bit one, as in this embodiment. The length L of the bridge module 260, however, does not exceed 94 mm. This means that the bridge module 260, when engaged with the backplane segments, does not extend beyond the connector J3 of the back side slots as is shown in FIG. 6, thereby not interfering with the insertion of add-in cards, such as a transition module, into the slots in the back side of the modular backplane 200.

Figure 6:
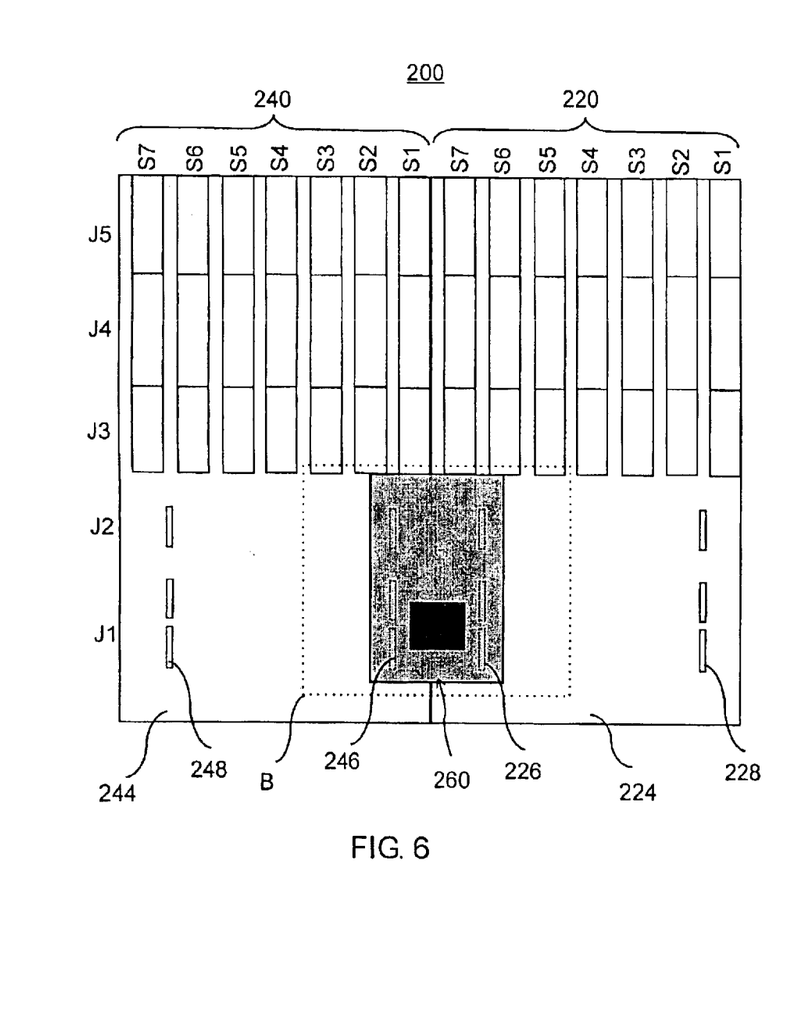
FIG. 6 is a schematic plane view of the back side of another modular backplane in accordance with the present invention.
Figure 7A:
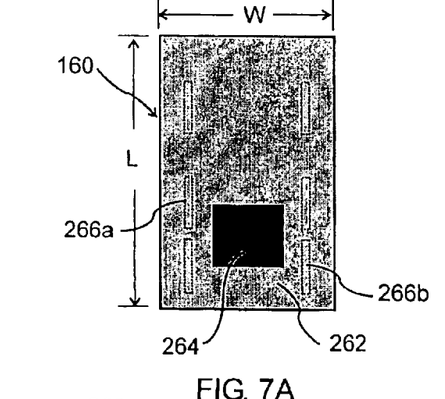
FIG. 7A is a schematic view showing the outer surface configuration of another bridge module in accordance with the present invention.
Figure 7B:
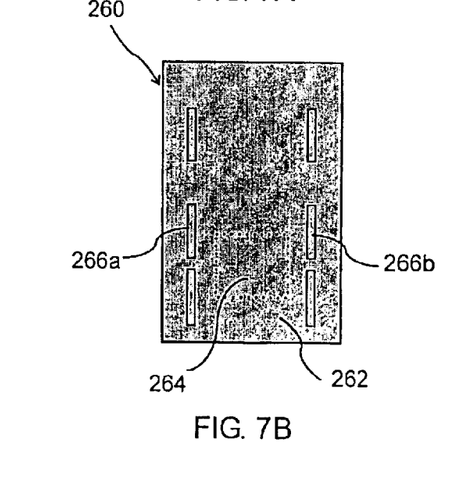
FIG. 7B is a schematic view showing the inner surface configuration of the bridge module in the FIG. 7A.
Figure 8A:
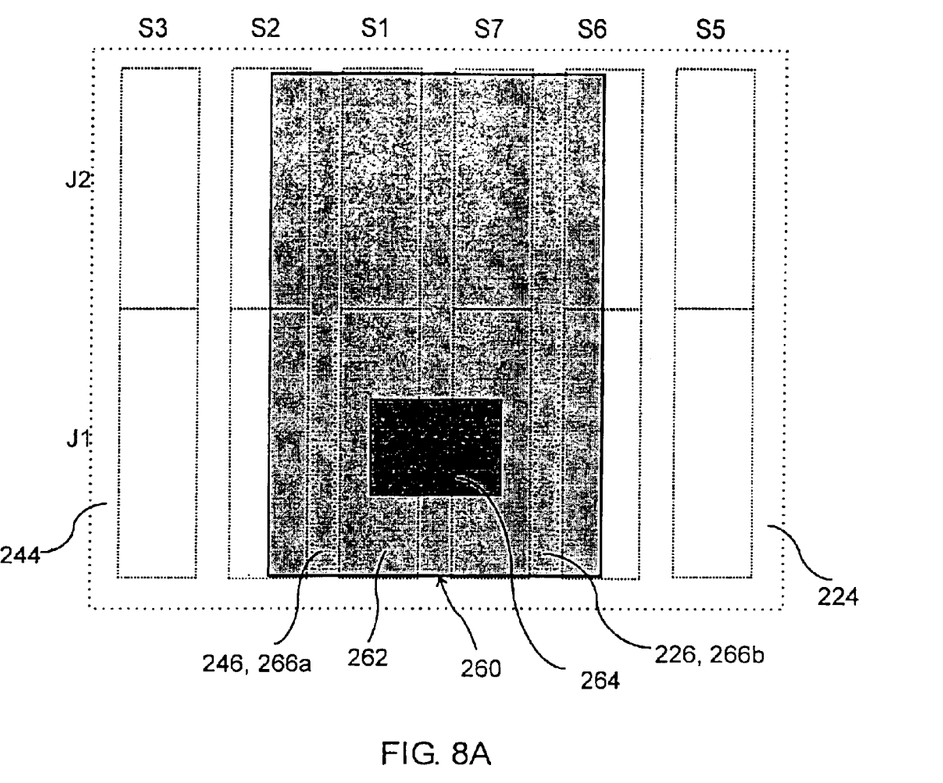
FIG. 8A is an enlarged view of the portion indicated by B in the FIG. 5.
Figure 8B:
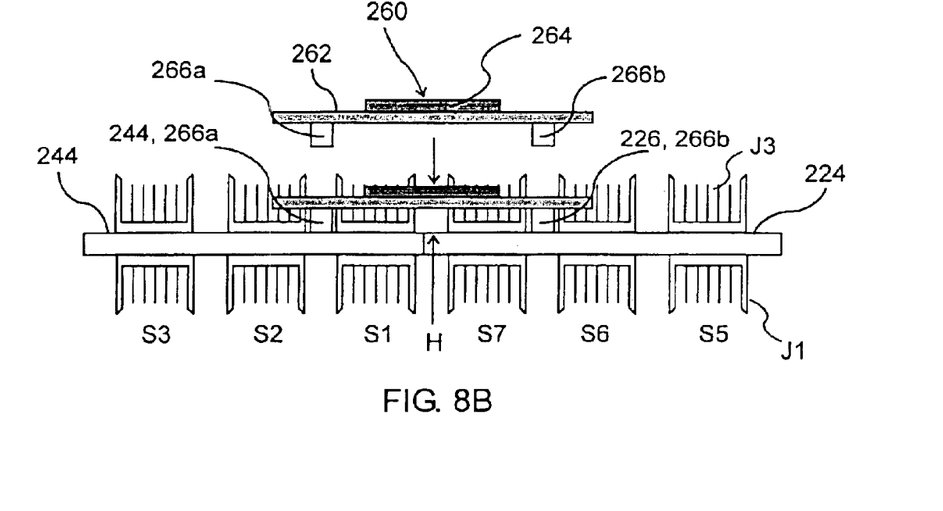
FIG. 8B is a frontal elevation view of the portion indicated by B in the FIG. 5.
Figure 10:
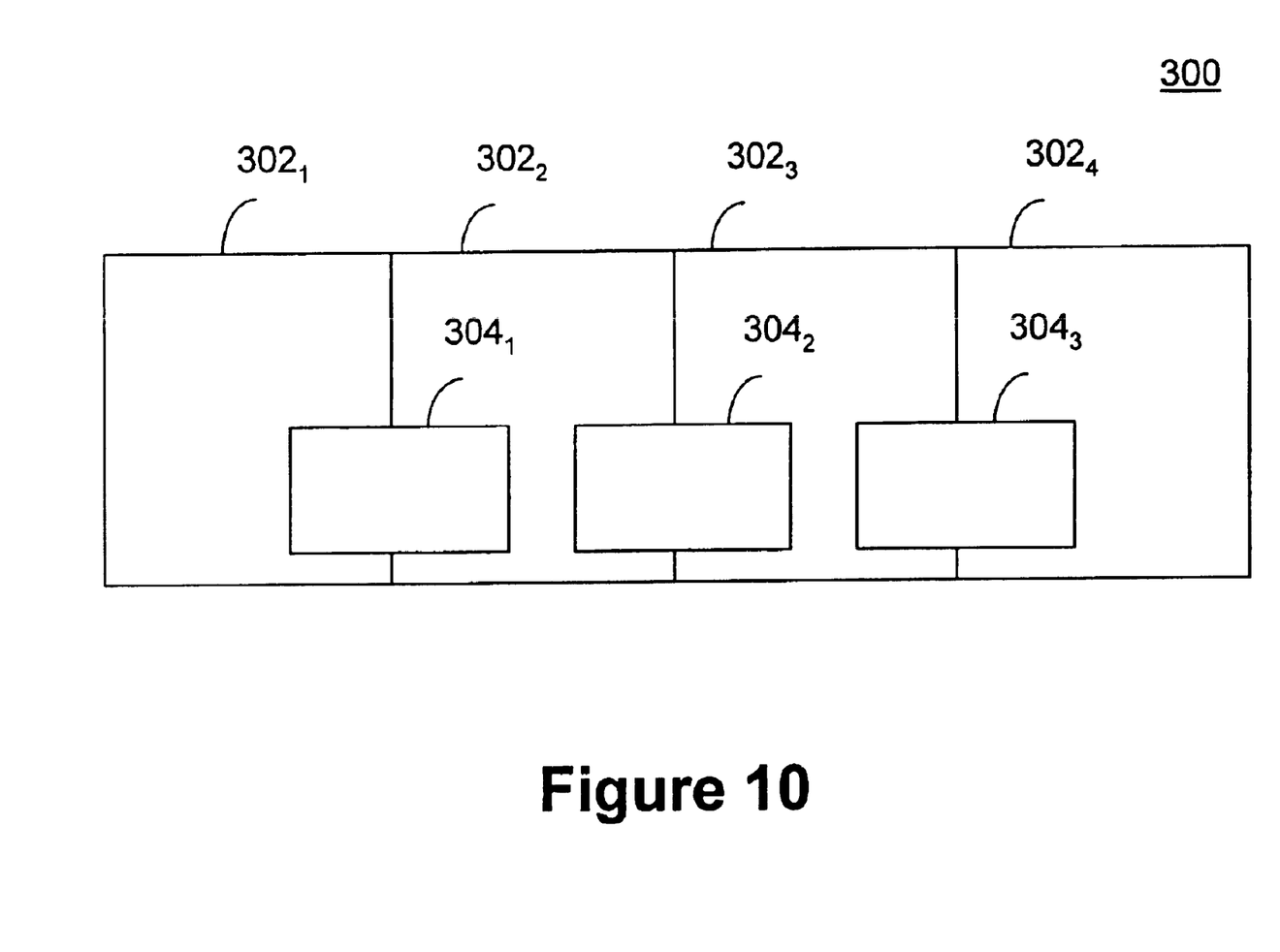
FIG. 10 is a schematic plane view showing an embodiment of the modular backplane of FIGS. 3 and 6.

FIG. 10 shows an embodiment of the modular backplane of FIGS. 3 and 6. In FIG. 10, the back side of a modular backplane 300 is illustrated. The modular backplane 300 includes a plurality of modular backplane segments $302_i$, and a plurality of bridge modules $304_j$. In FIG. 10, four modular backplane segments $302_i$ (i=1, 2, 3, 4) and three bridge modules $304_j$ (j=1, 2, 3) are illustrated as an example.

Each modular backplane segment $302_i$ may be similar to that of FIG. 3 or FIG. 6. The front side of each modular backplane segment $302_i$ has a plurality of slots (not shown). The back side of each modular backplane segment $302_i$ has primary and secondary dedicated connectors (e.g. 126 and 146 of FIG. 3, 226 and 246 of FIG. 6 ).

The bridge module $304_j$ has a pair of connectors (e.g. 166a, 166b of FIG. 5B, 226a, 226b of FIG. 8B), one of which is engaged with the primary dedicated connector of the modular backplane segments $302_j$ while the other connector is engaged with the secondary dedicated connector of the modular backplane segment which is adjacent to the modular backplane segment $302_j$. The modular backplane segments $302_K$ and $302_{K+1}$ (K=1, 2, 3) are communicatively connected by the bridge module $304_K$.

Figure 9:
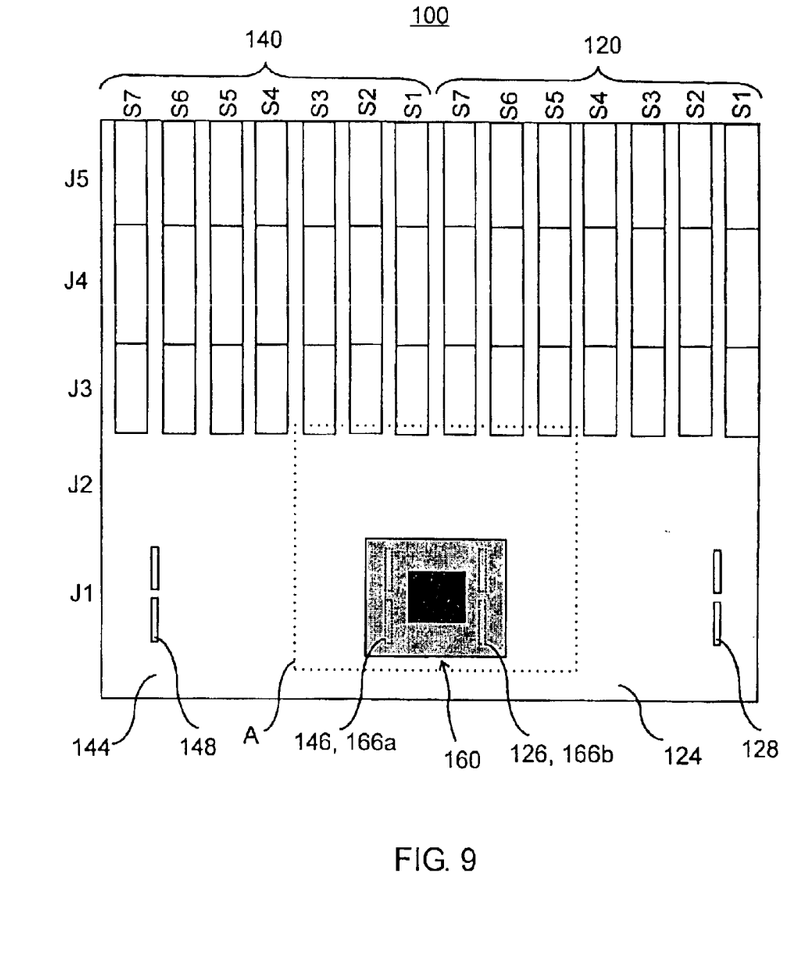
FIG. 9 is a schematic plan view of the back side of a monolithic backplane in accordance with the present invention.

Note that the present invention is also applicable not only to modular backplanes but also to monolithic backplanes having two buses. In other words, it is not necessary that the two backplane segments be physically separate from one another, as is illustrated in FIG. 9.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A modular backplane for an industrial computer comprising:
   a first modular backplane segment having a first front side and a first back side, the first front side including a plurality of slots, the first back side including a first dedicated connector located in an area having no slots on the first back side and no slots in the opposite area on the first front side;
   a second modular backplane segment having a second front side and a second back side, the second front side including a plurality of slots, the second back side including a second dedicated connector located in an area having no slots an the second back side and no slots in the opposite area on the second front side; and
   a bridge module having two connectors, one of which is engaged with the first dedicated connector and the other is engaged with the second dedicated connector, thereby communicatively connecting the first and second modular backplane segments.

2. A modular backplane for an industrial computer according to claim 1, wherein the bridge module further comprises a circuit board and a bridging integrated circuit.

3. A modular backplane for an industrial computer according to claim 1, wherein the height of the bridge module is less than that of the slot.

4. A modular backplane for an industrial computer according to claim 3, wherein the height of the bridge module is less than 16 mm.

5. A modular backplane for an industrial computer according to claim 1, wherein the width of the bridge module is less than 12 HP.

6. A modular backplane for an industrial computer according to claim 1, wherein the length of the bridge module is less than 94 mm.

7. A modular backplane for an industrial computer according to claim 1, wherein the first dedicated connector is disposed in an area between a right-most pair of slots in the front side of the first modular backplane segment, and the second dedicated connector is disposed in an area between a left-most pair of slots in the front side of the second modular backplane segment, and vice versa.

8. A modular backplane for an industrial computer according to claim 1, wherein the first back side and the second back side each further include a plurality of slots.

9. A modular backplane for an industrial computer according to claim 8, wherein the slots include J3, J4 and J5 connectors.

10. A modular backplane for an industrial computer according to claim 8, wherein the slots may provide for the insertion of add-in cards.

11. A modular backplane for an industrial computer according to claim 1, wherein the slots include J1, J2, J3, J4 and J5 connectors.

12. A modular backplane for an industrial computer according to claim 1, wherein the slots in the first front side provide for the insertion of a system slot board and a plurality of peripheral boards and all of the slots in the second front side for the insertion of a plurality of peripheral boards, and vice versa.

13. A modular backplane for an industrial computer according to claim 1, wherein the first front side and the second front side each include seven slots.

14. A modular backplane for an industrial computer comprising:
   a plurality of modular backplane segments, each modular backplane segment including a front first side and a back side, the front side including a plurality of slots, the back side including a primary dedicated connector and a secondary dedicated back side including a primary dedicated connector and a secondary dedicated connector, the primary and secondary dedicated connectors being located in an area having no slots on the back side and no slots in the opposite area an the front side; and
   a plurality of bridge modules for connecting the modular backplane segments, each bridge module having a pair of connectors, one of which is engaged with the primary dedicated connector in one of the modular backplane segments while the other connector is engaged with the secondary dedicated connector in its neighboring segments, and vice versa, such that all the modular backplane segments are communicatively connected.

15. A modular backplane for an industrial computer according to claim 14, wherein the bridge module further comprises a circuit board and a bridging integrated circuit.

16. A modular backplane for an industrial computer according to claim 14, wherein the height of the bridge module is less than that of the slot.

17. A modular backplane for an industrial computer according to claim 16, wherein the height of the bridge module is less than 16 mm.

18. A modular backplane for an industrial computer according to claim 14, wherein the width of the bridge module is less than 12 HP.

19. A modular backplane for an industrial computer according to claim 14, wherein the length of the bridge module is less than 94 mm.

20. A modular backplane for an industrial computer according to claim 14, wherein the primary and secondary dedicated connectors are provided in areas between a left-most pair of slots and a right-most pair of slots, respectively, in the front side of the modular backplane segment, and vice versa.

21. A modular backplane for an industrial computer according to claim 14, wherein the back side further include a plurality of slots.

22. A modular backplane for an industrial computer according to claim 21, wherein the slots include J3, J4 and J5 connectors.

23. A modular backplane for an industrial computer according to claim 21, wherein the slots may provide for the insertion of add-in cards.

24. A modular backplane for an industrial computer according to claim 14, wherein the slots include J1, J2, J3, J4 and J5 connectors.

25. A modular backplane for an industrial computer according to claim 14, wherein the slots in the front side of one of the backplane segments provide for the insertion of a system slot board and a plurality of peripheral boards and all of the slots in the front side of the remaining backplane segments for the insertion of a plurality of peripheral boards.

26. A modular backplane for an industrial computer according to claim 14, wherein the front side includes seven slots.

27. A monolithic backplane for an industrial computer comprising:

a first backplane segment having a first front side and a first back side, the first front side including a plurality of slots, the first back side including a first dedicated connector located in an area having no slots on the first back side and no slots in the opposite area on the first front side;

a second backplane segment having a second front side and a second back side, the second front side including a plurality of slots, the second back side including a second dedicated connector located in an area having no slots on the second back side and no slots in the opposite area on the second front side;

a bridge module having two connectors, one of which is engaged with the first dedicated connector and the other is engaged with the second dedicated connector, thereby communicatively connecting the first and second backplane segments.

28. A modular backplane for an industrial computer according to claim 1, wherein the back side has a first area where a plurality of slots are provided, and a second area where no slot is provided, the first and second dedicated connectors are provided in the second area.

29. A modular backplane for an industrial computer according to claim 28, wherein the front side has a third area where the slots are provided, and a fourth area where no slots are provided, the first and second dedicated connectors are provided in the second area which corresponds to the fourth area.

* * * * *